Jan. 7, 1964 J. L. JOHNSON 3,117,190

STEREOPHONIC PHONOGRAPH PICKUP

Filed June 19, 1961

INVENTOR.
Jay L. Johnson
BY
Stone, Nierman, Burmeister & Zummer
Attorneys

United States Patent Office 3,117,190
Patented Jan. 7, 1964

3,117,190
STEREOPHONIC PHONOGRAPH PICKUP

Jay L. Johnson, Niles, Mich., assignor to Electro-Voice, Incorporated, Buchanan, Mich., a corporation of Indiana Filed June 19, 1961, Ser. No. 118,153
7 Claims. (Cl. 179—100.41)

The present invention relates to phonograph pickups, and particularly to phonograph pickups for reproducing stereophonic records.

The patent application of Howard M. Durbin and John F. Wood entitled "Phonograph Pickup," Serial No. 736,819, filed May 21, 1958, discloses a phonograph pickup which employs a pair of bender type piezoelectric elements disposed within a casing and coupled to a drive arm through a compliant yoke. The drive arm carries a stylus at one end, and is compliantly mounted to the casing at the other end.

Bender type generating elements suitable for use in the Durbin and Wood construction described above are generally of the ceramic piezoelectric type, such as electrically polarized barium-titanite. Piezoelectric generating elements of the bender type are relatively costly, and further produce a substantially lower electrical output than available crystal type piezoelectric generating elements which are responsive primarily to twisting. An example of a crystal twister type piezoelectric element is Rochelle salts. The present invention is directed to utilize twister type piezoelectric crystals in a stereophonic phonograph pickup.

It is a further object of the present invention to provide a stereophonic phonograph pickup which utilizes twister type piezoelectric crystals and which optimizes the isolation between channels, that is, produces a minimum signal in one channel for a stylus deflection along the recording vector of the other channel. Stereophonic record discs as presently used record two channels in a single groove of the record, the channels being impressed on the record along vectors disposed on opposite angles of 45 degrees to the normal to the record surface.

One of the difficulties that has been experienced with such records is that the hills and dales of the two channels of the record groove occasionally coincide and produce intermodulation distortion, that is, the vertical component of both channels coincide to produce an excessive vertical movement of the stylus. It is a further object of the present invention to provide a sterophonic phonograph pickup which reproduces stereophonic sound with reduced intermodulation distortion.

It is a further object of the present invention to provide a phonograph pickup utilizing a pair of twister piezoelectric generating elements which is capable of reproducing stereophonic sound and which is also capable of reproducing monaural sound with a second stylus of a different diameter than the stylus utilized for stereophonic sound. In addition, the present invention is directed to the provision of a low cost phonograph pickup capable of stereophonic reproduction of sound from a record disc which is both simple in construction and capable of high electrical output.

These and further objects of the present invention will be readily apparent to those skilled in the art from a further reading of this disclosure, particularly when viewed in the light of the drawings, in which.

Figure 1:
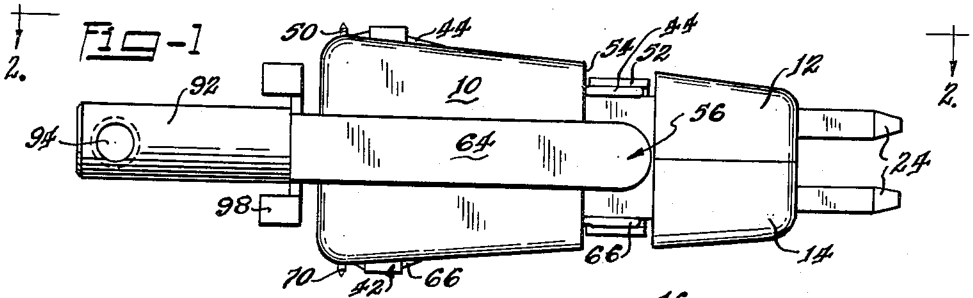
FIGURE 1 is a side elevation view of a phonograph pickup construction according to the teachings of the present invention.
Figure 2:
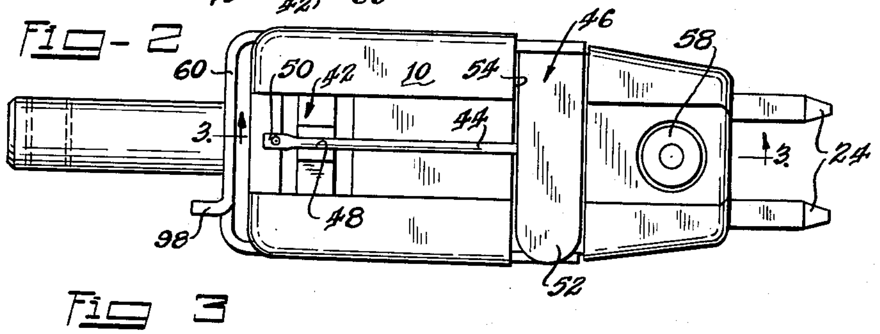
FIGURE 2 is a plan view of the phonograph pickup taken along lines 2—2 of FIGURE 1.
Figure 3:
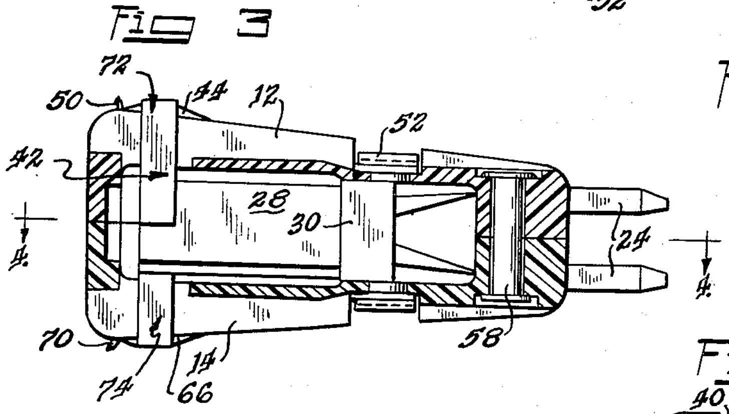
FIGURE 3 is a sectional view of the phonograph pickup taken along the lines 3—3 of FIGURE 2, the interior of the casing being illustrated in elevation.

As illustrated in FIGURES 1 through 5, the phonograph pickup has a casing 10 which is constructed of two parts 12 and 14. Each part 12 and 14 of the casing is provided with an internal recess 16 and 18, and recesses 16 and 18 are aligned to form a single elongated cavity 20. Four openings 22 located at the corners of a rectangle, are disposed at one end of the cavity 20, and these openings 22 extend to the exterior of the casing and accommodate electrical conducting pins 24 which form the terminals of the phonograph pickup. The casing is constructed of a rigid electrically insulating material, such as nylon, Zytel or other plastics.

A pair of twister type generating elements 26 and 28 are disposed within the cavity 20 of the casing 10, and mounted at one end by a compliant support member 30. The support member 30 is in the form of a block of compliant plastic material, or rubber, and has two apertures which accommodate the ends of the generating elements 26 and 28 and conform thereto. Each of the generating elements 26 and 28 are rectangular solids and have axes of elongation which are disposed approximately parallel to each other and parallel to the axis of elongation of the casing 10. These generating elements 26 and 28 respond primarily to twisting about their axes of elongation, and as a result of such twisting, generate potentials on the two flat surfaces 32 and 34 which are parallel to the major axis of the crystals.

Figure 4:
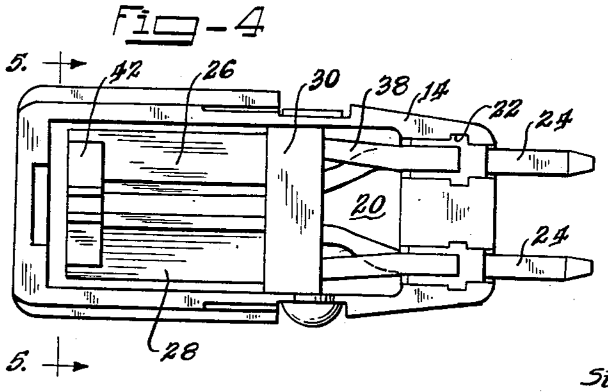
FIGURE 4 is a sectional view of the phonograph pickup of FIGURES 1 through 3 taken along the lines 4—4 of FIGURE 3, but illustrating the contents of the phonograph pickup casing in elevation.

Rochelle salt is a good material for the generating elements 26 and 28, and produces the optimum electrical response of the materials presently available. Each of these surfaces 32 and 34 is provided with an electrically conducting coating 36, and the four electrically conducting coatings 36 are connected to the four pins 24 which extend through the casing 10 by electrically conducting strips 38. As indicated in FIGURE 4, the pins 24 are molded into the plastic casing 10 to provide permanent electrical contacts to the exterior of the casing.

Each part 12 and 14 of the casing 10 is provided with an opening 40 confronting the ends of the generating elements 26 and 28 opposite the mounting block 30. A yoke 42 which will be described in greater detail, is mounted on this end of each of these generating elements 26 and 28 and extends through the two openings 40 in the parts 12 and 14 of the casing 10. A drive arm 44 is mounted at one end on the casing 10 by a clip 46 and extends parallel to the axis of the casing to engage a slot 48 in the portion of the yoke 42 which extends through the opening 40 of the part 12 of the casing 10. A stylus 50 is mounted on the end of the drive arm 44 opposite its mounting means and is adapted to engage a record groove.

The clip 46 has a first U-shaped spring 52 which is disposed transversely about the casing within a recess 54 in the exterior surface of the casing 10, and a second U-shaped spring 56 extends longitudinally about the perimeter of the casing 10 to lock the first spring 52 in position. The casing 10 is secured in position by a rivet 58, and the clip does not function to accomplish this end. The drive arms 44 and 66 are mounted on opposite legs of the first U-shaped spring 52, as is clear from FIGURES 1, 2 and 3. The second drive arm 66 engages a second slot 68 which is disposed in a portion of the yoke 42 protruding from the opening 40 in the second part 14 of the casing 10, and a second stylus 70 is mounted on the end of the second drive arm 66 opposite its mounting means.

Figure 5:
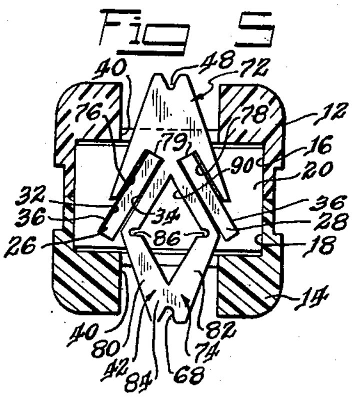
FIGURE 5 is a sectional view taken along the line 5—5 of FIGURE 4.

The yoke 42 is best illustrated in FIGURE 5, and can generally be described as having a generally triangularly shaped body portion 72 which extends through the opening 40 of the part 12, and a V-shaped portion 74 which extends through the opening 40 of the part 14. The body portion 72 is provided with two slots 76 and 78 which extend therein from adjacent to the V-shaped portion 74. The slots 76 and 78 have parallel walls which are spaced by a distance slightly greater than the thickness of the generating elements 26 and 28, and the generating elements 26 and 28 are slidably accommodated within the slots 76 and 78, respectively. The inner terminus 79 of the slots forms a stop for movement of the generating elements 26 and 28.

The side walls of the slots 76 and 78 are parallel to each other, and the walls of the slot 76 are disposed at an angle to the walls of the slots 78 between 45 degrees and 90 degrees. Even though the two axes of the recording on the record disc to be reproduced are normal to each other, the generating elements 26 and 28 are preferably at an acute angle to each other.

The V-shaped portions of the yoke 42 extends from the body portion 72 of the yoke, and specifically from the region adjacent to the edge of the generating elements 26 and 28 to the exterior of the casing 10. This V-shaped portion 74 defines a pair of legs 80 and 82 which extend from a region adjacent to the edge of the generating elements 26 and 28, respectively, to a common portion 84. The common portion 84 contains the slot 68 which engages the drive arm 66. The stylus 70 secured to this drive arm 66 is the one utilized for reproduction of stereophonic recordings. The leg 80 is provided with a slot 86 adjacent to the slot 76 and the generating element 26, and a second slot 86 is disposed in the leg 82 adjacent to the slot 78 and generating element 28. The slots 86 are in essence a region of reduced cross-section relative to the cross-section of the remaining portions of the legs 80 and 82, and the slots 86 are in a plane normal to the plane defined by the drive arms 44 and 66. Also, the slot 68 which engages the drive arm 66 is disposed on an axis at an acute angle to the region of contact of each of the legs 80 and 82 with their respective generating elements 26 and 28. The yoke 42 is constructed of a compliant of elastomeric material, such as polyvinyl chloride, so that a vertical deflection of the drive arm 66 will be partly reduced by the compliance of the slots 86 in the legs 80 and 82.

Figure 6:
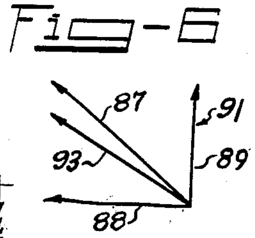
FIGURE 6 is a vector diagram illustrating the resolution of a force directed along the axis for reproducing sound from one channel of a stereophonic phonograph disc.

When the drive arm 66 is being driven by a stereophonic recording through the stylus 70, the force deflections of one channel will be at an angle of 45 degrees to the record's surface while the force deflections of the other channel will be at the complement of this angle. FIGURE 6 illustrates a force vector for one of the channels and designates this force vector 87. It is to be understood that the force vector of the other channel would be 90 degrees from this vector 87, but is not illustrated. This force vector 87 may be resolved into its horizontal component designated 88 and its vertical component designated 89. The slot 86 in the leg 80 inserts compliance along the vertical axis to a greater degree than the horizontal axis, thereby reducing the vertical component transmitted to the generating element 26, for example to the point 91 shown on the axis 89. The result of the reduction in the vertical component transmitted to the generating element 26 relative to the horizontal component shifts the angle of the force vector impressed on the generating element 26 to the vector 93. The vector 93, will be seen to be generally normal to the plane of the generating element 26 and directed at the lower corner thereof to produce a maximum twisting action about the axis of elongation of this element. At the same time, the force vector impressed upon the generating element 28 as a result of deflection along the vector 87 is close to parallel to the slot 78, thereby allowing the generating element 28 to slide within the slot 78. This slippage between the body 72 of the yoke 42 and the generating element 28 improves the signal isolation between channels. The slots 86 in the legs 80 and 82 reduce the electrical response for the vertical deflections, and thereby reduce intermodulation distortion.

The stylus 50 is utilized for reproduction of monophonic recordings, and such recordings impress lateral deflections upon the stylus. The body portion 72 of the yoke 42 impresses the lateral deflections upon the corners or edges of the generating elements 26 and 28, and these generating elements are now stopped within the slots 76 and 78, since the force exerted by the weight of the tone arm is in this direction. As a result, approximately equal electrical response is achieved on the two pairs of output terminals from this stereophonic pickup under these conditions.

It will be noted that a V-shaped indentation 90 extends into the body portion 72 of the yoke 42 from the portion 74 thereby providing an essentially diamond shaped opening in the yoke 42. This V-shaped indentation 90 is for a purpose of increasing the compliance of the phonograph pickup cartridge.

In a particular construction of a phonograph pickup according to the teachings of the present invention, the generating elements 26 and 28 are of Rochelle salts and have a cross-section of approximately 0.187 inch by 0.040 inch and a length of approximately .450 inch. The generating elements 26 and 28 have their surfaces 32 and 34 disposed at an angle of approximately 60 degree relative to each other. The yoke 42 has a thickness of 0.070 inch and a maximum dimension along the vertical axis as shown in FIGURE 5 of 0.474 inch. The leg portion 74 measures 0.160 inch from the common portion 84 to the edge of the slots 86, and the slots 86 leave approximately 0.012 inch of the leg remaining to drive the generating elements. The width of the slots 86 is approximately 0.020 inch. The yoke is constructed of polyvinyl chloride.

It is to be noted that the stereophonic phonograph pickup here described is a turnover type pickup, and a cylindrical shaft 92 extends from the second spring 56 of the clip 46 to provide the pivotal axis. A bore 94 through this shaft 92 is utilized for a handle to rotate the pickup, and a pair of wings 98 extend from second spring 56 for the purpose of providing stops with other equipment on the tone arm.

From the foregoing disclosure, those skilled in the art will readily devise many modifications of the present invention within the intended scope thereof. Further, the present invention clearly has applications above and beyond those here set forth. It is therefore intended that the scope of the present invention be not limited to the foregoing disclosure, but rather only by the appended claims.

The invention claimed is:

1. A phonograph pickup for stereophonic reproduction comprising a pair of piezoelectric elements having central axes, each of said piezoelectric elements generating an electrical potential responsive to twisting about the central axis thereof, means for mounting each of said elements at one end of the central axis thereof with the axes of the elements generally parallel to each other, each of said elements having a region adjacent to the end thereof opposite the mounting means with parallel surfaces, and the parallel surfaces of one element being at an angle between 45 degrees and 90 degrees from the parallel surfaces of the other element, a yoke of compliant material having a pair of slots with parallel walls extending therein, the parallel walls of each slot slidably engaging the parallel surfaces of one of the piezoelectric elements, said yoke having a portion with a pair of legs extending from a common region at an angle to each other no greater than a right angle, each of said legs extending to a portion of one of the surfaces of one of the elements on the opposite side of the central axis of the element from the inner terminus of the slot containing said element, each of said legs having a slot extending therein to reduce the cross-section of said leg, a stylus, and means for coupling said stylus to the common region of the legs.

2. A phonograph pickup for stereophonic reproduction comprising a pair of piezoelectric elements having central axes, each of said piezoelectric elements generating an electrical potential responsive to twisting about the central axis thereof, means for mounting each of said elements at one end of the central axis thereof with the axes of the elements in a common plane and the elements disposed adjacent to each other, each of said elements having a region adjacent to the end thereof opposite the mounting means with parallel surfaces, and the parallel surfaces of one element being at an angle between 45 degrees and 90 degrees from the parallel surfaces of the other element, a yoke of compliant material having a pair of slots with parallel walls extending therein, the parallel walls of each slot slidably engaging the parallel surfaces of one of the piezoelectric elements, a stylus, and means for coupling said stylus to the yoke on a plane bisecting the angle between the generating elements.

3. A phonograph pickup for stereophonic reproduction comprising a pair of piezoelectric elements having central axes, each of said piezoelectric elements generating an electrical potential responsive to twisting about the central axis thereof, means for mounting each of said elements at one end of the central axis thereof with the axes of the elements generally parallel to each other, each of said elements having a region adjacent to the end thereof opposite the mounting means with parallel surfaces, and the parallel surfaces of one element being at an angle of approximately 60 degrees from the parallel surfaces of the other element, a yoke of compliant material having a pair of slots with parallel walls extending therein, the parallel walls of each slot slidably engaging the parallel surfaces of one of the piezoelectric elements, a stylus, and means for coupling said stylus to the yoke on a plane bisecting the angle between the generating elements.

4. A phonograph pickup for stereophonic reproduction comprising a casing having a cavity therein and an opening extending from the exterior of the casing into the cavity, a pair of piezoelectric elements having axes of elongation disposed within the cavity, each of said piezoelectric elements generating an electrical potential responsive to twisting about the axis of elongation thereof, means disposed at one end of the cavity for mounting each of the elements at one end of the axis of the elements generally parallel to each other, each of said elements having a region adjacent to the end thereof opposite the mounting means with parallel surfaces, and said regions confronting the opening in the casing, and the parallel surfaces of one element being disposed at an angle between 45 degrees and 90 degrees from the parallel surfaces of the other element, a yoke of compliant material having a pair of slots with parallel walls extending therein, the parallel walls of each slot slidably engaging the parallel surfaces of one of the piezoelectric elements, said yoke having a portion with a pair of legs extending from a common region disposed exterior of the casing, said legs extending at an angle to each other no greater than a right angle, each of said legs extending to a portion of one of the surfaces of one of the elements on the opposite side of the axis of elongation of the element from the inner terminus of the slot containing said element, a stylus drive arm disposed exterior to the casing and mounted at one end on the casing, a stylus mounted on the other end of said drive arm, the drive arm abutting the common portion of the yoke and being anchored thereto.

5. A phonograph pickup for stereophonic reproduction comprising a pair of piezoelectric elements having axes of elongation, each of said piezoelectric elements generating an electrical potential responsive to twisting about the central axis thereof, means for mounting each of said elements at one end with the axes of the elements generally parallel to each other, each of said elements having a region adjacent to the end thereof opposite the mounting means with parallel surfaces, and the parallel surfaces of one element being an angle between 45 degrees and 90 degrees from the parallel surfaces of the other element, a yoke of compliant material having a pair of slots with parallel walls extending therein, the parallel walls of each slot slidably engaging the parallel surfaces of one of the piezoelectric elements, said yoke having a portion with a pair of legs extending from a common region at an angle to each other no greater than a right angle, each of said legs extending to a portion of one of the surfaces of the elements on the opposite side of the axis of elongation of the element from the inner terminus of the slot containing said element, said yoke having a triangular portion extending from the terminus of the slots remote from the common portion of the yoke, a first stylus, means for coupling said first stylus to the common region of the legs of the yoke, a second stylus, and means for coupling said second stylus to the apex of the triangular portion of the yoke.

6. A phonograph pickup for stereophonic reproduction comprising a casing having a cavity therein and a pair of openings extending through the casing into the cavity from opposite sides of the cavity, a pair of piezoelectric elements having axes of elongation disposed within the cavity, each of said piezoelectric elements generating an electrical potential responsive to twisting about the axis of elongation thereof, means mounted within the cavity remote from the openings for mounting each of said elements at one end with the axes of the elements generally parallel to each other, each of said elements having a generally rectangular cross-section forming a pair of parallel opposite flat surfaces, and the parallel surfaces of one element being disposed at an angle of approximately 60 degrees from the parallel surfaces of the other element, a yoke of compliant material having a pair of slots with parallel walls extending therein, the parallel walls of each slot slidably engaging the parallel surfaces of one of the piezoelectric elements, said yoke having a portion with a pair of legs extending from a common region at an angle to each other no greater than a right angle, the common region of said legs being disposed exterior to the casing and the legs extending through one of the openings thereof, each of said legs extending to a portion of one of the surfaces of one of the elements on the opposite side of the axis of elongation from the inner terminus of the slot containing said element, said yoke having a triangular portion extending from the inner terminus of the slots through the other opening of the casing and terminating in an apex exterior to the casing, said triangular portion of the yoke having a groove therein, and the common portion of the yoke having a second groove therein, a first drive arm mounted at one end on the exterior of the casing disposed within the groove of the triangular portion, a first stylus mounted on the end of the first drive arm remote from the mounted end thereof, a second drive arm mounted on the exterior of the casing at one end and disposed within the groove of the common portion of the yoke, and a second stylus disposed on the end of the second drive arm remote from the mounted end thereon.

7. A stereophonic phonograph pickup comprising the elements of claim 6 wherein each of the legs of the yoke are provided with a slot extending therein on a plane normal to the plane of the bisector of the angle formed by the walls of the slots in the yoke, said slots in the legs of said yoke reducing the cross-section of said legs and forming a compliance therein.

References Cited in the file of this patent

UNITED STATES PATENTS 2,934,610 Dieter ---------------- Apr. 26, 1960

FOREIGN PATENTS 1,246,271 France ---------------- Oct. 10, 1960